July 17, 1934.                F. A. PARSONS                1,966,967
                        MILLING MACHINE ORGANIZATION
                  Original Filed Sept. 16, 1931      4 Sheets-Sheet 1
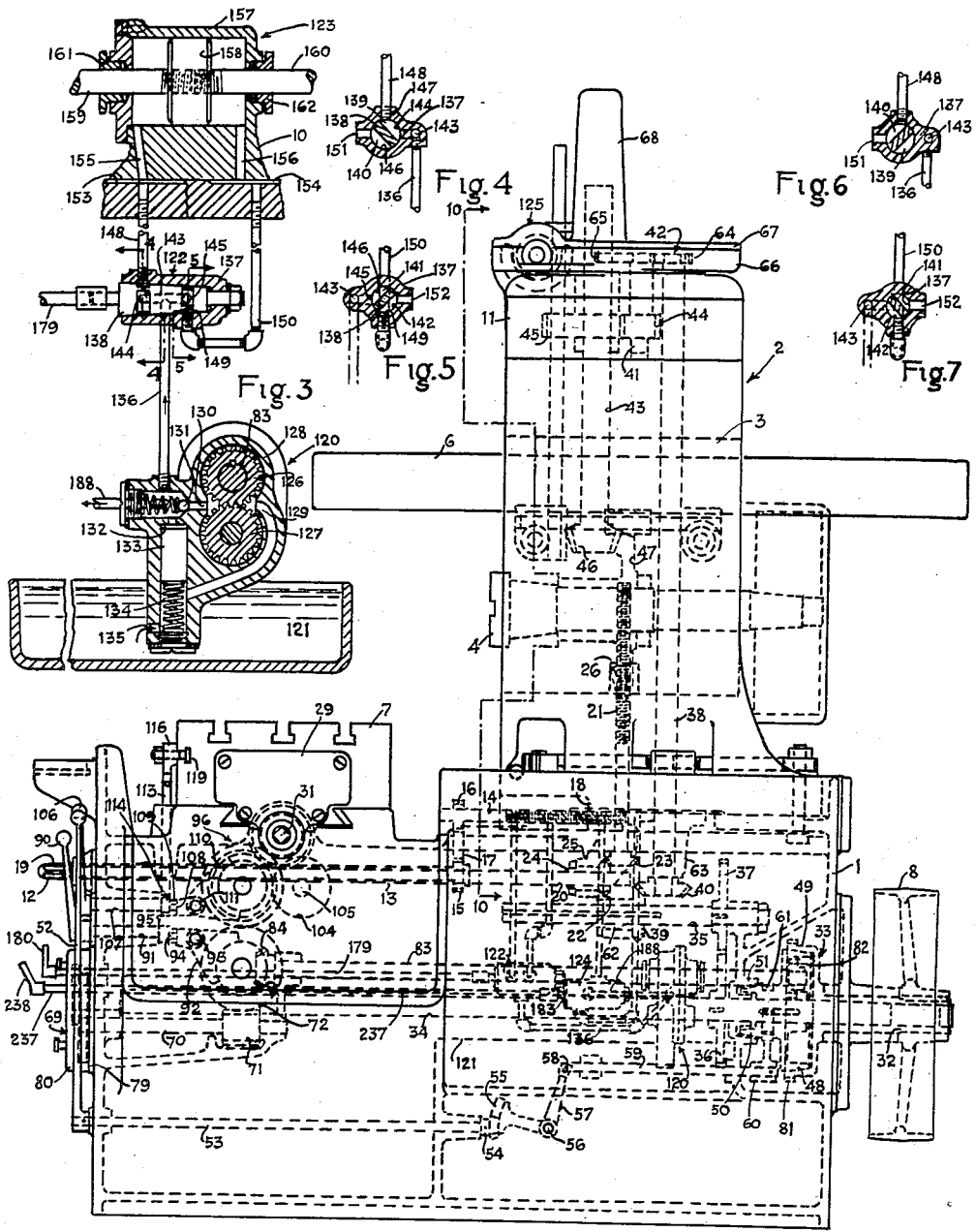
INVENTOR
Fred A Parsons

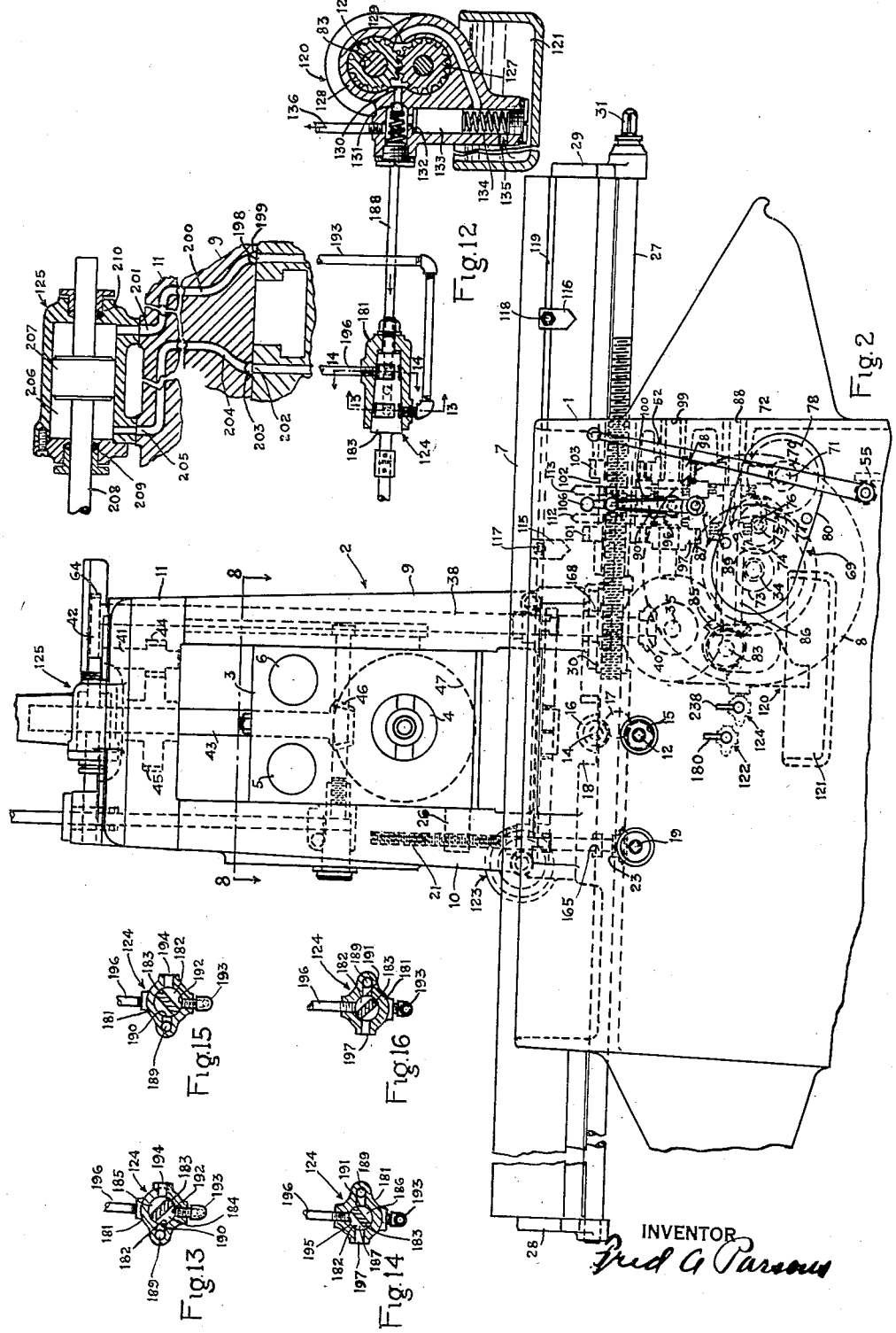

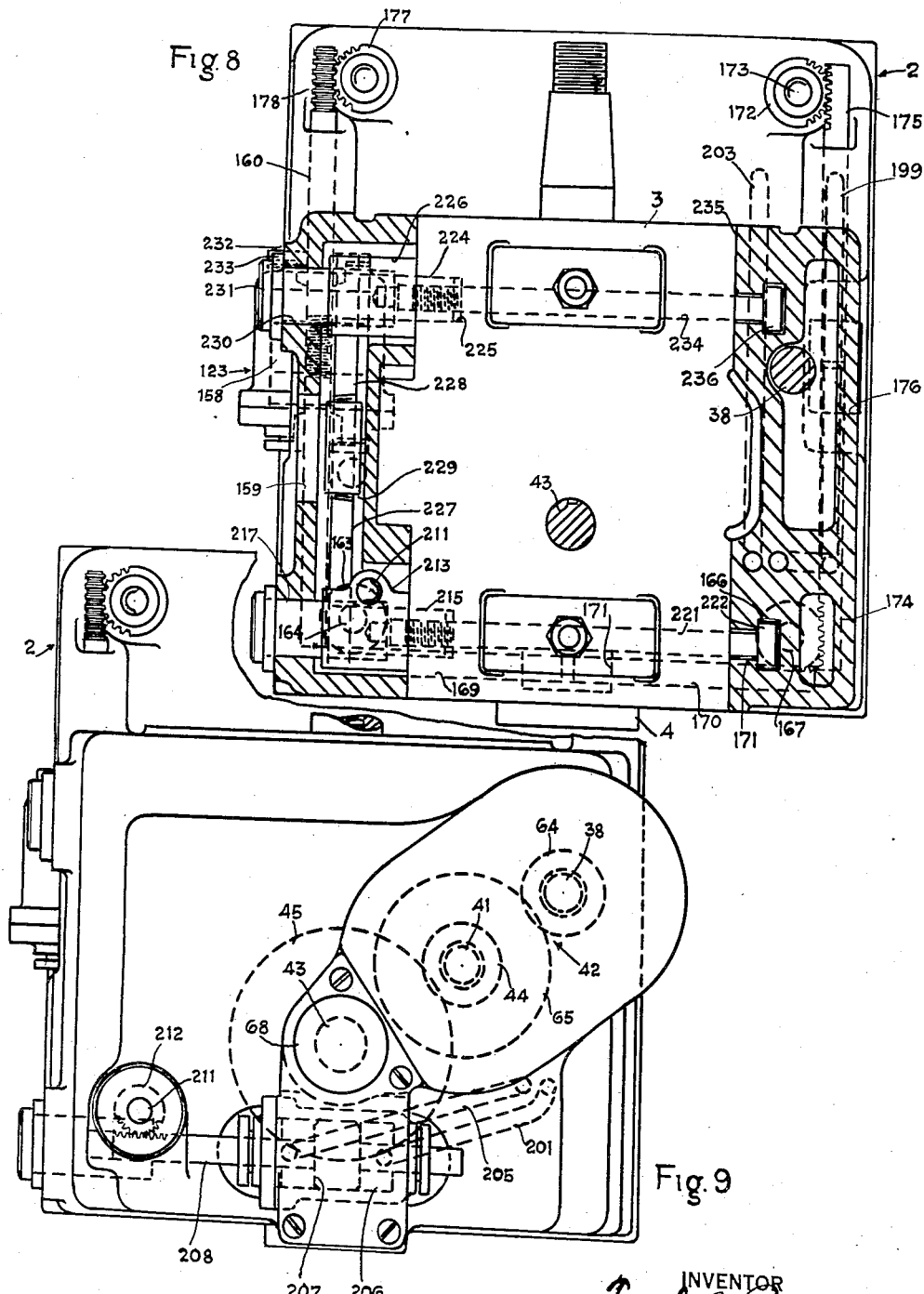

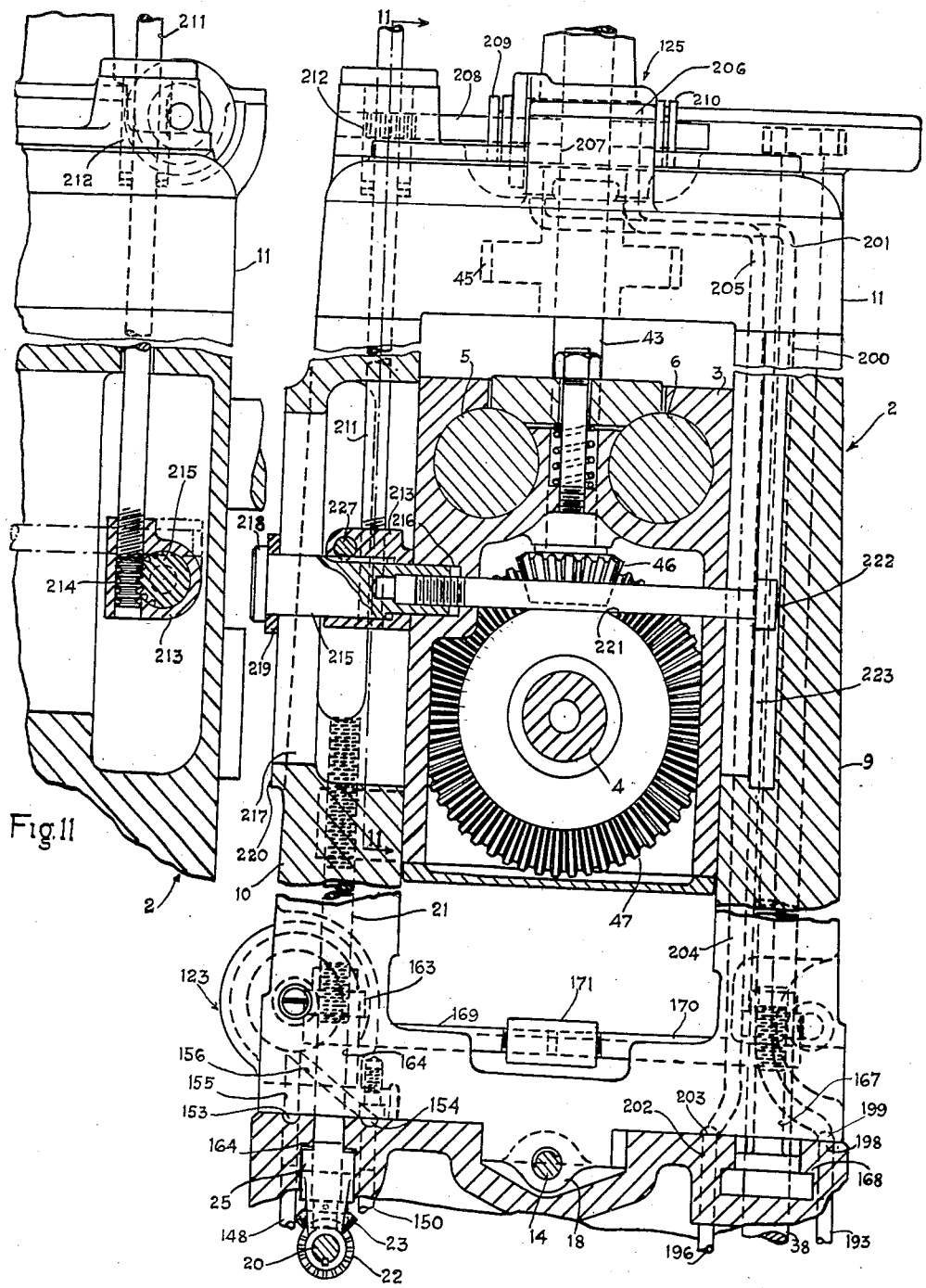

Patented July 17, 1934

1,966,967

UNITED STATES PATENT OFFICE 1,966,967

MILLING MACHINE ORGANIZATION

Fred A. Parsons, Milwaukee, Wis., assignor to Kearney & Trecker Corporation, West Allis, Wis.

Application September 16, 1931, Serial No. 563,037
Renewed April 25, 1934

7 Claims. (Cl. 90—16)

This invention relates to improvements in milling machines.

An object of the invention is to provide improved and simplified operating mechanism, particularly with respect to the adjustment of movable supports and the clamping thereof in adjusted positions, and an improved relationship thereof with the structure and other mechanism of the machine.

Other objects relate to improved and simplified power operated clamps, particularly with reference to the combination thereof with the transmission and control mechanism of a milling machine.

Other objects relate generally to improvement and simplification in the construction and operation of milling machines, and still other objects will be apparent from the accompanying specification and claims.

Fig. 1 shows a right side elevation of a milling machine incorporating the invention.

Fig. 2 is a front elevation of the same machine.

Fig. 3 is a diagrammatic section of certain hydraulic mechanism.

Fig. 4 is a section on the line 4—4 of Fig. 3.

Fig. 5 is a section on the line 5—5 of Fig. 3.

Figs. 6 and 7 show the above sections with a rotatable member in another position.

Fig. 8 is a horizontal section taken on line 8—8 of Fig. 2, and enlarged.

Fig. 9 shows a top view of a portion of Figs. 1 and 2 enlarged.

Fig. 10 is a partial vertical section taken along line 10—10 of Fig. 1 and enlarged.

Fig. 11 is a vertical section taken along line 11—11 of Fig. 10.

Fig. 12 shows a diagrammatic section of certain hydraulic mechanism.

Fig. 13 is a section taken on line 13—13 of Fig. 12.

Fig. 14 is a section taken on line 14—14 of Fig. 12.

Figs. 15 and 16 show the latter sections with a rotatable member in a different position.

The invention consists, as seen in Figs. 1 and 2, in a machine having a base 1 supporting thereon for slidable adjustment in a horizontal path a head frame generally denoted by numeral 2 in turn supporting for vertical adjustment a spindle carrier 3, the spindle carrier supporting a rotatable spindle or tool support 4 and overarms 5 and 6 for well-known purposes. Base 1 also supports for reciprocatory movement in a path transverse to spindle 4 a work table or support 7, the spindle and table being movable by power through suitable power trains originating in a power source, in the present instance illustrated as a pulley 8.

Head frame 2 comprises side portions 9 and 10 and a top portion 11 and may be manually moved relative to base 1, as above suggested, by the application of a crank, or the like, not shown, to a squared portion 12 of a shaft 13 journaled in bed 1 and driving a screw shaft 14 through gears 15 and 16 fixed with the respective shafts and connected through a suitable idler gear 17. Screw shaft 14 is restrained against axial movement in bed 1 and is threaded to engage a nut portion 18 projecting downwardly from head frame 2 into a suitable slot formed in base 1. Rotation of shaft 13 may accordingly cause sliding movement of head frame 2 on base 1.

Manual movement of spindle carrier 3 may be obtained through the application of a similar crank, or the like, to a squared portion 19 of a shaft 20 also journaled in bed 1 and actuating a vertical screw shaft 21 journaled in portion 10 of head frame 2. To allow the above mentioned horizontal adjustment of head frame 2 the shafts are connected by bevel gears 22 and 23, gear 22 having an elongated hub portion 24 journaled in a bracket 25 depending from head frame 2 through a slot formed in base 1 and being slidably keyed with shaft 20 so that it may travel along the shaft and follow movements of the head frame 2. Gear 22 meshes with and drives gear 23 which is fixed with screw shaft 21. Shaft 21 is fixed against axial movement relative to head frame 2 and is suitably threaded for engagement with a nut portion 26 extending laterally from spindle carrier 3.

Table 7 is movable through rotation of a table screw 27 journaled in bearings 28 and 29 fixed with table 7 and restrained against axial movement relative thereto, the screw engaging a nut portion 30 fixed with base 1 and having a squared portion 31 for the reception of a crank, or the like, not shown, for effecting hand movement of the table.

The power train from pulley 8 to spindle 4 is as follows: Pulley 8 is fixed with and drives a sleeve 32 journaled in a portion of base 1 and driving, through a motion interrupter or clutch generally denoted by numeral 33, a shaft 34, shaft 34 driving a shaft 35 through gears 36 and 37 meshed together and fixed with the respective shafts. Shaft 35 drives a vertical shaft 38 through bevel gears 39 and 40 and vertical shaft 38 drives a shaft 41 journaled in an upper portion of head frame 2 through a rate changer generally denoted by numeral 42. Shaft 41 drives a vertical shaft 43 through gears 44 and 45, gear 44 being fixed with shaft 41 and gear 45 being journaled in head frame 2 and slidably keyed with shaft 43 to allow vertical movement of the shaft in response to adjustment of spindle carrier 3. Shaft 43 drives spindle 4 through bevel gears 46 and 47 fixed respectively with the shaft and spindle.

Clutch 33 comprises inner and outer members 48 and 49 adapted to be pressed together into frictional engagement, member 49 being fixed with sleeve 32 and member 48 being slidably keyed with shaft 34 which is journaled in base 1 and in sleeve 32, the sleeve forming a part of a bearing for properly positioning the parts of clutch 33. Member 48 has an extended portion 50 adapted for frictional engagement with a portion 51 fixed with base 1, the two constituting a brake for arresting rotation of shaft 34 when desired. Member 48 when forced to the right in Fig. 1 engages member 49 and communicates motion to shaft 34, but when moved to the left in Fig. 1, disengages from member 49 and engages, through portion 50, with portion 51 to stop such rotation. Member 48 may be moved to the left and right through movement of a hand lever 52 to the right and left respectively in Fig. 2. Lever 52 is fixed with a shaft 53 journaled in base 1 and actuating, through a bevel gear 54, a sector 55 fixed with a shaft 56, the shaft being journaled in base 1 and carrying a lever 57 actuating, through a pin and slot connection 58, a shaft 59 slidably supported in base 1 and carrying a fork member 60 engaging an annular groove 61 formed in clutch member 48.

Bevel gear 39 has an extended hub portion 62 journaled in a bracket 63 depending from head frame 2 through a slot formed in base 1 and is slidably keyed with shaft 35 to slide along the shaft during movement of head frame 2 relative to base 1, the gear engaging bevel gear 40 which is fixed with shaft 38.

Rate changer 42 comprises gears 64 and 65 meshed together in a suitable housing 66, the gears being removably keyed respectively to shaft 38 and 41, whereby they may be moved and interchanged or replaced with others of different ratio also interchangeable for producing different rates in shaft 41, housing 66 having a removable closure 67 to facilitate access to the gears. Shaft 43 is slidably fitted in gear 45 and journaled at one end in a portion of spindle carrier 3 and a housing 68 is provided for protecting the vertically extending end of shaft 48.

The feed drive to table 7 includes above mentioned shaft 34 driving, through a rate changer generally denoted by numeral 69, a shaft 70 journaled in bed 1 and driving, through a worm 71 fixed with the shaft, a worm wheel 72 constituting the terminal element of the feed train.

Rate changer 69 comprises a gear 73, Fig. 2, driving a gear 74 removably keyed with a sleeve 75 journaled on a stud 76, a gear 77 being also removably keyed with sleeve 75 and driving a gear 78 removably keyed with shaft 70. The gears are of different sizes and may be removed and replaced in various combinations, or others substituted for producing various rates in shaft 70, the whole being contained in a suitable housing 79 having a movable closure 80 for ready access to the gears.

A rapid traverse drive for table 7 originates in a gear 81 fixed with member 49 and driving, through a gear 82 meshed therewith, a shaft 83 journaled in base 1, shaft 83 driving, through bevel gears 84 and 85, a sleeve member 86 constituting a terminal of the rapid traverse train.

Feed terminal member 72 has suitable clutch teeth for engagement with a shiftable member 87 slidable on a shaft 88 journaled in bed 1 and sleeve 86, while sleeve member 86 has a clutch portion 89 provided with suitable clutch teeth for engagement with member 87, the member engaging terminal member 72 when moved to the right in Fig. 2 and clutch portion 89 when moved to the left, there being an intermediate position in which it engages neither. Member 87 may be shifted from a hand lever 90 fixed with a shaft 91, Fig. 1, journaled in bed 1 actuating a fork member 92 slidable on a rod 93 fixed with base 1 through a pin 94 fixed eccentrically in an end portion of shaft 91 and engaging a slot 95 formed in fork member 92. Movement of the lever will accordingly cause sliding of fork 92 on rod 93, the fork engaging the sides of member 72 to impart sliding motion thereto.

Member 87 drives table screw 27 through a reverser generally denoted by numeral 96 comprising gears 97 and 98 spaced apart on a shaft 99 journaled in bed 1 and having suitable clutch teeth for alternative engagement with clutch teeth formed on a gear member 100 meshed with suitable gear teeth on member 87. Gear member 100 is located between gears 97 and 98 on shaft 99 and is slidable into engagement with one or the other, member 100 having an intermediate position free of engagement with either. Gear 97 meshes with and drives a gear 101 fixed with a sleeve 102 journaled in suitable bearings fixed with base 1, the sleeve being slidably keyed with table screw 27. Gear 98 drives a gear 103 also fixed with sleeve 102, but through an idler gear 104 journaled on a suitable stud 105 fixed with base 1. Rotation of gear 97 from gear member 100 will accordingly drive sleeve 102 and table 7 in one direction, while rotation of gear 98 from member 100 will drive sleeve 102 and table 7 in the opposite direction. A hand lever 106 is provided for shifting member 100, the lever being fixed with a shaft 107 journaled in base 1 and actuating, through an eccentric pin 108 engaging a slot 109, a shifter fork 110 slidable on a rod 111 fixed with base 1 and engaging the sides of gear member 100. Shifting of lever 106 will accordingly cause shifting of member 100 and determine the direction of movement of table 7.

Automatic means may be provided for causing table 7 to stop at any desired predetermined point, in the present instance comprising plungers 112 and 113 vertically slidable in base 1 and adjacent a longitudinal edge of table 7. The plungers have rack teeth engaging opposite sides of a gear 114, Fig. 1, fixed with shaft 107 whereby movement of lever 106 will cause raising of one plunger and lowering of the other. Conversely, shaft 107 may be operated by downward pressure upon one or the other of the plungers. Dogs 115 and 116 may be fixed with the longitudinal edge of table 7 at predetermined points, there being bolts 117 and 118 respectively engaging a T-slot, or like, 119 formed in table 7. The parts are so arranged that upon lever 106 being shifted to the left in Fig. 2, table 7 will travel to the left, plunger 112 will be lowered, and plunger 113 raised into the path of dog 116. At any desired point determined by the location of dog 116 plunger 113 will be encountered by the dog and depressed, rotating shaft 107 in a clockwise direction and disengaging gear member 100 from gear 98, thus stopping further movement of table 7. Similar operation would take place in the event that table 7 were moving to the right, dog 115 encountering plunger 112 and stopping the table as before.

Head frame 2 and spindle carrier 3 may be clamped after being moved into desired positions by means of the mechanism, above described, by power from pulley 8, power trains for this purpose originating in a fluid pump and accumulator 120, Figs. 1, 2, 3, 12, supported within base 1 and driven from rapid traverse shaft 83 and taking fluid from a reservoir 121 disposed in base 1, fluid from accumulator 120 passing by means of a control valve generally denoted by numeral 122 and suitable channels to a fluid motor generally denoted by numeral 123, Figs. 2 and 3, located on side portion 10 of head frame 2, the motor being connected, as will be presently described, to cause clamping of the head frame. Fluid also passes by way of a control valve generally denoted by numeral 124 to a fluid motor generally denoted by numeral 125 located on upper portion 11 of head frame 2 and having suitable connections for clamping spindle carrier 3, to be presently described.

Pump 120, as particularly shown in Figs. 3, 12, may be of any suitable type, but in the present instance comprises gears 126 and 127 meshed together within a closely fitting housing 128 providing inlet and outlet ports 129 and 130 respectively. Gear 126 is fixed with and driven from shaft 83 so that the pump runs whenever pulley 8 is driven. Port 130 discharges through a check valve comprising a spring pressed ball 131 into the upper portion of an accumulator cylinder 132 in which is slidably fitted a piston 133 pressed upwardly by a spring 134. Fluid under pressure accumulating in cylinder 132 depresses piston 133 against the resistance of spring 134, a body of fluid being maintained in cylinder 132 sufficient for instantaneous needs in the various fluid motors. Piston 133 upon traveling downwardly a predetermined amount intercepts and blocks inlet port 129 which communicates with bore 132 at a point normally beneath piston 133, there being a suction port 135 admitting fluid from reservoir 121 to cylinder 132. The supply of fluid to the pump will accordingly be cut off at such times as a sufficient amount of fluid under pressure is available in cylinder 132 and, since the pressure of the accumulator is prevented from reaching port 130 by means of check valve 131, the pump will run idle and consume very little power.

Fluid flows from accumulator cylinder 132 through a pipe 136, Figs. 3 and 1. The control valve 122 comprises a body portion 137 having a valve member 138 rotatively fitted therein, the member having cut-away portions in different parts of its length, as shown in Figs. 4, 5, 6, and 7, at 139, 140, 141, and 142. Pipe 136 communicates with a passage 143 formed in body portion 137 and ports 144 and 145 communicate from passage 143 with bore 146 at points opposite cutaway portions 139 and 141. A port 147 enters bore 146 in the region of cut-away portion 139 and above port 144 and connects with a pipe 148 leading to fluid motor 123, a second port 149 entering bore 146 in the region of cut-away portion 142 and below port 145, connecting with a pipe 150 leading to fluid motor 123. Exhaust ports 151 and 152 enter bore 146 substantially opposite ports 144 and 145 respectively.

Pipe 148 communicates with a groove 153, Figs. 3 and 10, formed in base 1 and pipe 150 communicates with a groove 154 also formed in base 1 substantially parallel to groove 153, the grooves being closed by a lower surface of head frame 2, and ports 155 and 156 registering with grooves 153 and 154 respectively in the various adjusted positions of head frame 2.

Motor 123 comprises a cylinder 157, Fig. 3, fixed with port 10 of head frame 2 and having a piston 158 slidably fitted therein and actuating piston rods 159 and 160 threadedly engaged with the piston and entering the cylinder through suitable packing devices 161 and 162 respectively. With valve member 138 in the position shown in Figs. 4 and 5, fluid will flow from pipe 136 through port 144, bore 146, port 147, pipe 148, groove 153, and port 155 to the left end of cylinder 157, forcing piston 158 to the right in Fig. 3, fluid already in cylinder 157 passing out through port 156, groove 154, pipe 150, port 149, bore 146, and exhaust port 152 to reservoir 121. If valve member 138 is turned through 90 degrees, as indicated in Figs. 6 and 7, fluid will flow from pipe 136 through pipe 150 to the right and port 156 to the right end of cylinder 157, forcing piston 158 to the left, fluid in the left end of cylinder 157 passing out through port 155, pipe 148, and exhaust port 151 to reservoir 121. Piston 158 is connected for clamping head frame 2 upon movement in one direction and unclamping head frame 2 upon movement in another direction.

Referring to Fig. 8, rods 159 and 160 extend substantially parallel to spindle 4, rod 159 having rack teeth engaging gear teeth formed in a nut 163 engaging a T-bolt 164 extending downwardly and engaging a suitable T-slot 165, Fig. 2, formed in base 1. Movement of piston 158 upwardly in Fig. 8 will thus cause tightening of nut 163. A second nut 166 engaging a T-bolt 167 acting in T-slot 168 of base 1 is actuated from movement of nut 163, racks 169 and 170 secured together by means of a suitable adjustable coupling 171 engaging the gear teeth of nut 163, and other gear teeth formed in nut 166 through adjustment of coupling 171. The effective length of the connection formed by racks 169 and 170 may be adjusted to insure the two nuts taking up simultaneously.

A similar arrangement permits operation of a nut 172 threaded on a T-bolt 173 also engaging T-slot 168, racks 174 and 175 engaging the respective nuts and being fixed together by means of an adjustable coupling 176. A fourth nut 177 is operated from piston 158 through piston rod 160, the rod having circular rack teeth 178 engaging gear teeth formed on the nut whereby the rod may be adjusted in piston 158 to the correct effective length to cause nut 177 to take up simultaneously with the others. Actuation of control valve 122 will accordingly cause clamping or unclamping of head frame 2 and for maximum convenience in operation of the valve, means are provided for controlling it from the front of the machine in the neighborhood of the other control members and on the opposite side of table 7 from spindle 4.

Valve member 138 has an elongated operating stem or rod 179, Fig. 1, extending therefrom to base 1 and carrying an actuating handle 180. Movement of this handle will accordingly clamp or unclamp head frame 2 at any time while pulley 8 is running.

Control valve 124, as shown in Figs. 12, 13, 14, 15, 16, comprises a body portion 181 having a bore 182 in which is fitted a rotatable valve member 183 having cut-away portions 184, 185, 186, and 187. Pipe 188 leading from accumulator 120 communicates with a channel 189 formed in body portion 181 and having ports 190 and 191 entering bore 182 in the regions of cut-away portions 184 and 186 respectively. A port 192 enters bore 182 below port 190 and communicates with a pipe 193 leading to fluid motor 125. An exhaust port 194 enters bore 182 substantially opposite port 190. A port 195 enters bore 182 above port 191 and communicates with a pipe 196 leading to fluid motor 125 and an exhaust port 197 enters bore 182 substantially opposite port 191. Pipe 193, as more particularly shown in Fig. 10, communicates with a port 198 formed in an upper surface of base 1 and adapted to register in the various adjusted positions of head frame 2 with a groove 199 formed in an under surface of portion 9 of the head frame for providing communication of fluid to a passage 200 in the various adjusted positions of the head frame, passage 200 communicating, through a port 201 formed in portion 11 of head frame 2, with fluid motor 125.

In similar manner pipe 196 communicates with a port 202 registering with a groove 203 which communicates with a passage 204 communicating, through a port 205, with fluid motor 125.

Motor 125 comprises a cylinder 206 having a piston 207 slidably fitted therein and fixed with a piston rod 208 entering the cylinder through suitable packings 209 and 210. Port 205 communicates with the left end, as seen in Figs. 10, 12, of cylinder 206, while port 201 communicates with the right end thereof.

With valve member 183 in the position shown in Figs. 12, 13, and 14, fluid will flow from pipe 188 through port 190, bore 182, port 192, pipe 193, port 198, groove 199, passage 200, and port 201 to the right end of cylinder 206, forcing piston 207 to move to the left, fluid already in the left end of cylinder 206 passing out through port 205, passage 204, groove 203, port 202, pipe 196, port 195, bore 182, and exhaust port 197 to reservoir 121. In the position of valve member 183 shown in Figs. 15 and 16, fluid will flow from pipe 188 through port 191 to pipe 196 and through passage 204 to the left end of cylinder 206, forcing piston 207 to the right, fluid in the right end of cylinder 206 passing out through passage 200, pipe 193, and exhaust port 197 to reservoir 121.

Movement of piston 207 in one direction causes clamping of spindle carrier 3, while movement of the piston in the opposite direction causes unclamping thereof. Movement of piston rod 208, as particularly shown in Fig. 9, causes rotation of a vertical shaft 211 slidably journaled in head frame 2, piston rod 208 having suitable rack teeth engaging a gear 212 journaled in a portion of head frame 2 and slidably keyed to shaft 211 so that shaft 211 may follow vertical movements of spindle carrier 3. Shaft 211, as more particularly shown in Fig. 11, is threaded into a member 213 and has circular rack teeth 214 engaging gear teeth formed on a nut member 215 journaled in a bore 216, Fig. 10, in spindle carrier 3 and supporting member 213. Rotation of shaft 211 through the action of fluid motor 125 will thus cause vertical movement of the shaft relative to member 213 and, through rack teeth 214, rotation of nut member 215. Nut member 215 extends outwardly through a slot 217 formed in portion 10 of head frame 2 and has a head portion 218 engaging, through a washer member 219, a surface 220 of head frame 2. Nut member 215 has a bore for threaded engagement with a bolt 221 extending therefrom through carrier 3 and having a head portion 222 engaging a T-slot 223 formed in portion 9 of head frame 2 opposite slot 217. Rotation of nut member 215 will accordingly compress or distort the sides of head frame 2 sufficiently to clamp carrier 3 rigidly in adjusted position. A second nut member 224, Fig. 8, is fitted in a bore 225 of carrier 3 and supports a member 226 similar to member 213. Nut member 224 is rotated from movement of nut member 215 through racks 227 and 228 engaged respectively with gear teeth on nut 215 and nut 226, the racks being connected by an adjustable coupling 229 whereby their length may be correctly adjusted to insure taking up of both nuts simultaneously. Nut 224 extends through a slot 230 formed in head frame 2 and has a head portion 231 engaging a surface 232 through a washer member 233, the nut being threadedly connected with a bolt 234 engaging a T-slot 235 formed in head frame 2 by means of a head portion 236, the nut and bolt acting to compress a portion of head frame 2 in the same manner as nut 215 and bolt 221. Accordingly shifting valve member 183 to one of the positions shown in Figs. 13, 14, 15, 16, will cause clamping of the carrier 3, while shifting the valve member to the opposite position will cause unclamping of the carrier, as above outlined.

For convenience in the operation of valve 124 a rod or stem 237 is fixed with valve member 183, as shown in Fig. 1, and extends forwardly through base 1 to a position on the opposite side of table 7 from head frame 2 convenient for operation and carries an operating handle 238. It is thus possible to clamp or unclamp carrier 3 by means of power by merely operating handle 238 and without leaving the normal operating position in front of the machine. Thus head frame 2 and carrier 3 may be adjusted and clamped at any time with a maximum of convenience and without leaving a normal operating position adjacent the other controls of the machine.

The above being a complete description of an illustrative embodiment of the invention, what is claimed is:

1. In a milling machine, the combination of a horizontally reciprocable work table, a supporting structure therefor including a base, a rotatable tool spindle at a level above said table, a spindle supporting structure supported from said base and uprising adjacent a longitudinal edge of said table and at one side of a vertical plane passing through said edge, said table and said spindle being relatively bodily movable in a direction transverse to the path of table movement and said structures providing guide portions maintaining a predetermined alignment of the spindle axis relative to the path of said reciprocatory movement during said relative movement, a transmission for rotation of said spindle including a power source and a motion interrupter supported from said base at said side of said vertical plane, clamp means associated with said guide portions and operable for restraining said bodily movement, said clamp means including a movable element, a fluid operable motor connected for movement of said element, a fluid pump connected for operation of said motor, a power train connecting said fluid pump for operation from said power source exclusive of said motion interrupter, and means controlling the operation of said motor from said pump including a hand operable portion positioned for movement at the other side of said vertical plane.

2. In a milling machine, the combination of a horizontally reciprocable work table, a supporting structure therefor, a rotatable tool spindle at a level above said table, a spindle supporting structure uprising adjacent a longitudinal edge of said table, said table and said spindle being relatively bodily movable in a plurality of mutually transverse paths and said structures providing a plurality of guides each maintaining a predetermined alignment of the axis of said spindle relative to the path of reciprocatory movement of said table and respectively during said relative movement in the different paths thereof, a plurality of clamp means respectively associated with different of said guides and respectively operable to restrain said bodily relative movement in different of said paths said clamp means including a plurality of movable elements respectively associated with the different clamp means, a power source, branch lines each originating in said power source and respectively connected to different of said elements, and a plurality of control devices respectively associated with different of said branch lines and independently operable for individually controlling the connection of said power source with the different elements.

3. In a milling machine, the combination of a horizontally reciprocable work table, a supporting structure therefor including a base, a rotatable tool spindle at a level above said table, a spindle supporting structure supported from said base and uprising adjacent a longitudinal edge of said table and at one side of a vertical plane passing through said edge, said table and said spindle being relatively bodily movable in a plurality of mutually transverse paths and said structures providing a plurality of guides each maintaining a predetermined alignment of the axis of said spindle relative to the path of reciprocatory table movement and respectively maintaining said alignment during said relative movement in the different paths thereof, a plurality of clamp means respectively associated with different of said guides and respectively operable to restrain said bodily relative movement in different of said paths said clamp means including a plurality of movable elements respectively associated with the different clamp means, a power source supported from said base at said side of said vertical plane, branch lines each originating in said power source and respectively connected to different of said elements, and a plurality of control devices respectively associated with different of said branch lines and independently operable for individually controlling the connection of said power source with the different elements, said control devices each including a portion positioned for movement at the other side of said vertical plane.

4. In a milling machine, the combination of a horizontally reciprocable work table, a supporting structure therefor including a base, a rotatable tool spindle at a level above said table, a spindle supporting structure supported from said base and uprising adjacent a longitudinal edge of said table and at one side of a vertical plane passing through said edge, said table and spindle being relatively bodily movable in a plurality of mutually transverse paths and said structures providing a plurality of guides each maintaining a predetermined alignment of the axis of said spindle relative to the path of reciprocatory table movement and respectively maintaining said alignment during said relative movement in the different paths thereof, a spindle rotating transmission including a power source and a motion interrupter supported from said base at said side of said vertical plane, manually operable means for said relative bodily movement in each of said paths, a plurality of clamp means respectively associated with different of said guides and respectively operable to restrain said relative bodily movement in the different paths, said clamp means including a plurality of movable elements respectively associated with the different clamp means, a plurality of power trains respectively connected for movement of different of said elements and each driven from said power source to exclude said motion interrupter, and a plurality of control devices respectively associated with the different power trains and independently operable for individually controlling the connection of said power source with the different elements, said control devices each including a portion positioned at the other side of said vertical plane and independently manually operable.

5. In a milling machine, the combination of a horizontally reciprocable work table, a supporting structure therefor including a base, a rotatable tool spindle at a level above said table, a spindle supporting structure supported from said base and uprising adjacent a longitudinal edge of said table and at one side of a vertical plane passing through said edge, said table and spindle being relatively bodily movable in a plurality of mutually transverse paths and said structure providing a plurality of guides each maintaining a predetermined alignment of the axis of said spindle relative to the path of reciprocatory table movement and respectively maintaining said alignment during said relative bodily movement in the different paths thereof, manually operable means for said relative movement in each of said paths, a power source supported from said base at said side of said vertical plane, a plurality of clamp devices respectively associated with different of said guides and respectively operable to restrain said relative movement in different of said paths, said clamp devices including a plurality of movable elements respectively associated with the different devices, a pump driven from said power source, a plurality of fluid operable motors each connected for operation from said pump and respectively connected for movement of different of said elements, a plurality of control valves respectively controlling the operation of different of said motors, and a plurality of manually operable elements respectively connected with different of said valves for the individual operation thereof and each exposed for operation at the other side of said vertical plane.

6. In a milling machine, the combination of a horizontally reciprocable work table, a supporting structure therefor including a base, a rotatable tool spindle at a level above said table, a spindle supporting structure supported from said base and uprising adjacent a longitudinal edge of said table and at one side of a vertical plane passing through said edge, said spindle being bodily movable in a plurality of paths each transverse to the path of table movement said structure providing a plurality of guides respectively for the different paths of said bodily movement, a transmission for rotation of said spindle including a power source and a motion interrupter, a plurality of clamp means respectively operable for restraining said bodily movement in different of said paths, a power train connected for movement of each of said clamp means and driven from said power source exclusive of said motion interrupter, and control means for controlling the connection of said power train including hand operable means positioned at the other side of said vertical plane.

7. In a milling machine, the combination of a horizontally reciprocable work table, a supporting structure therefor including a base, a rotatable tool spindle at a level above said table, a spindle supporting structure supported from said base and uprising adjacent a longitudinal edge of said table and at one side of a vertical plane passing through said edge, said table and said spindle being relatively bodily movable in a direction transverse to the path of table movement and said structures providing guide portions maintaining a predetermined alignment of the spindle axis relative to the path of said table movement during said relative movement, a transmission for rotation of said spindle including a power source and a motion interrupter supported from said base at said side of said vertical plane, clamp means associated with said guide portions and operable for restraining said bodily movement, said clamp means including a movable element, a power train driven from said source exclusive of said motion interrupter and connectible for operation of said element, and means controlling the operation of said element from said power train including a hand operable portion positioned for movement at the other side of said vertical plane.

FRED A. PARSONS.